S. LEWIS.
SALT APPARATUS.
No. 170,005.  Patented Nov. 16, 1875.
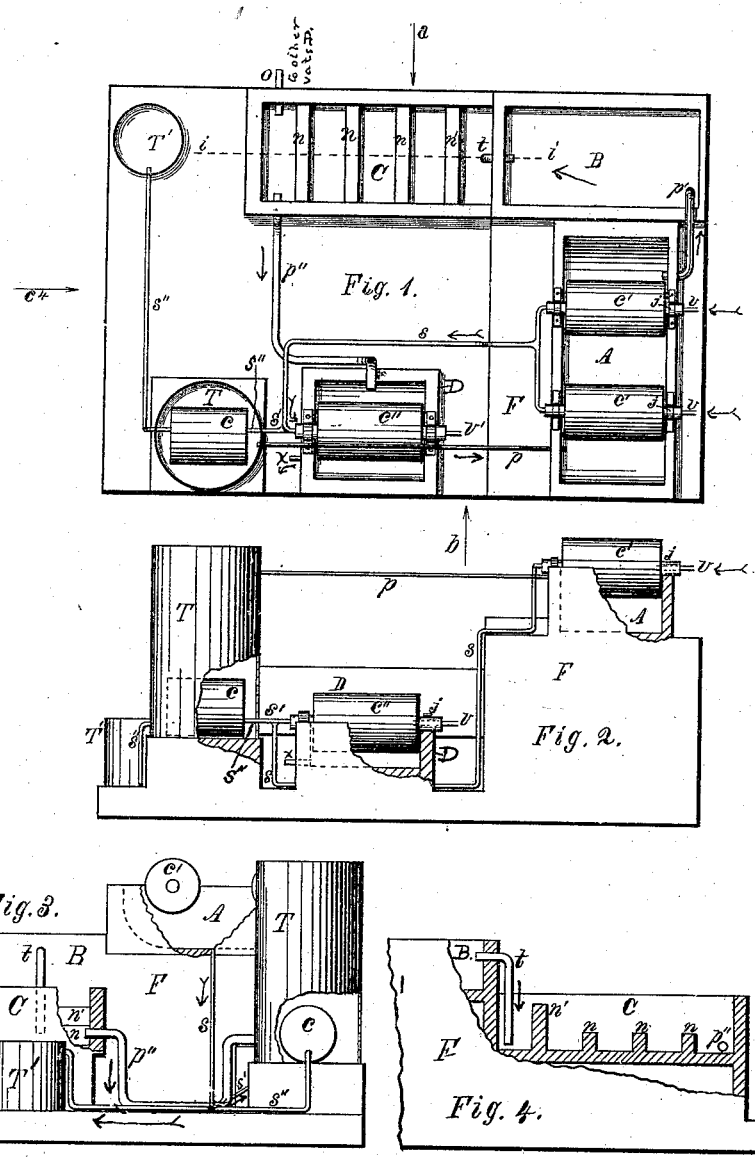

UNITED STATES PATENT OFFICE.

SYLVESTER LEWIS, OF ROCHESTER, NEW YORK.

IMPROVEMENT IN SALT APPARATUS.

Specification forming part of Letters Patent No. 170,005, dated November 16, 1875; application filed March 17, 1875.

*To all whom it may concern:*

Be it known that I, SYLVESTER LEWIS, of the city of Rochester, in the county of Monroe and State of New York, have discovered a new and useful Improvement in the Manufacture of Salt; and I do hereby declare that the following is a full, clear, and exact description of the construction and operation of the invention, sufficient to enable those who are skilled in the art to which it appertains to manufacture and use the same, reference being had to the drawings accompanying this specification, and to the figures and letters of reference marked thereon, in which like letters refer to like parts throughout the specification, and in which—

Figure 1 represents a plan or top view of the invention. Fig. 2 represents a side view in Fig. 1, shown by the arrow $b$. Fig. 3 represents the ends $c''$, in Fig. 1. Fig. 4 represents a side, $a$, in Fig. 1, over the dotted line $i$.

This invention relates to a purifying apparatus for manufacturing common salt, and is an improvement upon, or an addition to, an evaporating apparatus patented to Samuel D. Gilson, No. 108,701, October 25, 1870, on the same subject-matter.

Heretofore in the manufacture of common salt, by either solar or artificial heat, the impurities held in solution in the crude brine have been retained through the entire process of manufacturing, and, consequently, have passed into the concretions of the different qualities of salt manufactured, by which means the chlorides of as many different degrees of strength as the different wells, springs, or of whatever other source from which the brine may be obtained, are brought into domestic use, and become incorporated with the various articles of food for man and beast; and the object of my invention is, first, after saturation, but before concretion, while the brine at the temperature of 216° to 220°, and density 90° salometer, is passing from the saturating to the crystallizing vats, to separate from the brine all impurities, muriates, sulphates, and chlorides, known by the general term of bitterns, held in the brine; and, second, to a greater extent than ever before, to utilize exhaust steam in heating crude brine and cold water for the steam-boiler before introduced to the boiler and heating-vat; and, third, to furnish, at about the same price as common salt is now furnished, a purer and whiter article for domestic uses than has heretofore been furnished. It consists, first, in receiving-tanks for cold water and crude brine; second, in a system of pipes for conducting exhaust steam and fresh water, before and after heating or saturation, to and through the several vats and tanks; third, in vats for receiving the saturated brine, and conduits for conveying the same through the said vats, and means, previous to crystallization, for separating the different chlorides from the brine, as will now be more fully described, as follows: The wood or metal tank T is either round or square, and built high enough above the level of the vat A to give, between the tank and said vat, sufficient descent to draw off the brine through the pipe $p$ into the vat A. In the lower part of the tank T there is a cylinder, $c$, for receiving from the cylinders $c'$, through the escape-pipes $s\ s'$, the exhaust steam by which the crude brine is partially heated preparatory to drawing off the same into the vat A. From the cylinder $c$ the further-exhausted steam is discharged through the pipe $s''$ into the fresh-water tank T', and condensed and assimilated in the water of the same, from which it is pumped into the steam-boiler for the purpose of becoming, together with other fresh water, again converted into steam, thus utilizing all the heat and water in the exhaust steam.

For producing a continuous descent from the vaporizing-vat A to the crystallizing-vat D the vat A is placed on a platform, F. The cylinders $c'$, rotated by steam-power on suitable journals $j$, affixed to the shell of the vat A, admit steam for heating and radiating heat to their cavities through pipes $v$ affixed to their journals $j$.

By means of these steam-heated cylinders $c'$ the brine is brought to the point of saturation at 90° salometer, and temperature 216° to 220°, in which condition it is drawn from the vat A, by the pipe $p'$, onto the floor of the vat B. Like the preceding, this vat is of wood, about two feet deep, and otherwise large enough to hold enough brine to keep the works in operation about twelve hours.

In quiet brine, the chlorides, being of greater specific gravity than the brine, tend to seek the bottom, and the object in delivering the saturated brine onto the floor of the vat B is to facilitate the precipitation of the same, from which they are removed, as desired.

In further carrying out the object of purifying the brine after saturation, another vat, C, is placed in line with the vat B; but, to aid in passing the brine from the vat B into vat C, it is dropped about the depth of the vat B below that vat, and a pipe, $t$, is inserted at the opposite end from where the brine entered the vat B, about three inches below its top edge, for conducting the brine to the floor of the vat C, which vat C is constructed as the preceding, and for the same object; but, in addition to that, this vat has a series of cross-partitions, $n$ and $n'$, in number, as desired, more or less, $n'$ built from the floor to within about four inches of the top, and $n$ about one-third of the height of the vat, the object of which partitions being to form between them spaces in which the brine, in passing from its induction-point in one end of the vat to the eduction-point in the other end, makes eddies or pools of quiet brine to aid in precipitating the chlorides, so that the saturated brine being let in on the floor of the first division, leaving the heaviest portions there, rises, and in succession flows, from the bottom over the top of all the partitions, the quantity of chlorides becoming less and less in each division to the last passed over, near the floor of which the eduction-pipe $p''$ conducts the brine to the crystallizing-vat D, on reaching which the brine is supposed to be freed from all impurities except the chloride of calcium, for separating which from the brine the vat D is constructed deep enough to leave beneath the crystallizing-cylinder $c''$ a deep space, as desired, where the brine remains at rest and the calcium thrown to the floor, from which it is drawn off at will by the pipe $x$ at the bottom of the vat. The crystallizing-cylinder, dipping in the brine only about an inch, does not agitate it to prevent precipitation. Steam for heating and radiation is admitted to the cavity of this cylinder by the pipe $v'$, which, after admission, radiates its heat to the periphery of the cylinder, and, as the cylinder rotates, dipping slightly in the brine, a portion of the same is continually as it passes through the brine attaching and adhering to its peripheral surface, which, by the action of the heat, is converted into salt crystals, or chloride of sodium. Adjusted, as desired, to this cylinder is a knife (not shown) that scrapes the salt from the same as it is formed on the cylinder. Opposite to where the eduction-pipe $p''$ is inserted in the vat C another pipe, O, for the same object, is inserted for other crystallizing-vats, as desired, on the other side of the vat, to be used in making salt by either solar or artificial heat. By this construction steam is made to subserve three different purposes—that is, the same steam is applied three different times: first, in heating the brine in the vat A; second, in heating the crude brine by admitting it to the cylinder $c$ in the bottom of tank T; and then, third, in taking it to tank T' for heating the water for the steam-boiler, where it is merged and lost in the same. All foreign matter is eliminated from the brine before passing onto the periphery of the crystallizing-cylinder, and when the salt is removed therefrom and collected for use it presents a clean and snowy appearance.

Having now described the construction and operation of my improvement, I do not claim any rotating cylinders, nor applying steam to evaporating brine, or any way of removing crystallized salt from rotating cylinders, as this has all been done heretofore; but

What I claim, and wish to secure by Letters Patent, is—

1. The platform F upholding the vats A B C, vat B, provided with the induction-pipe $t'$, vat C, having the partititions $n$ and $n$ by which the chlorides are separated from the brine, pipes $p''$ and $o$ for drawing off the purified brine, and pipe $x$ for expelling the chloride of calcium, in combination with the cylinders $c'$ $c''$, all arranged in the manner substantially as shown and set forth.

2. In combination, the tank T, provided with the cylinder $c$, by which exhaust steam is used for heating crude brine, tank T', by which the same further-exhaust steam is again used for heating water for the steam-boiler, and the cylinders $c'$ and $c''$, arranged substantially as shown and described.

In witness whereof I have hereunto set my hand this 16th day of February, A. D. 1875.

SYLVESTER LEWIS.

Witnesses:
WILLIAM F. SANDWAY,
ORRIN L. SMITH.